United States Patent [19]

Schwiete

[11] Patent Number: 5,171,967
[45] Date of Patent: Dec. 15, 1992

[54] STUD-WELDING CIRCUIT WITH A PLURALITY OF OUTPUTS

[75] Inventor: Bernd Schwiete, Witten, Fed. Rep. of Germany

[73] Assignee: TRW Nelson Bolzenschweiss-Technik GmbH & Co. KG, Fed. Rep. of Germany

[21] Appl. No.: 671,865

[22] Filed: Apr. 4, 1991

[51] Int. Cl.[5] .................................. B23K 9/20
[52] U.S. Cl. .......................... 219/130.1; 219/98
[58] Field of Search ............... 219/98, 99, 130.1

[56] References Cited

U.S. PATENT DOCUMENTS

| | | | |
|---|---|---|---|
| 3,475,585 | 10/1969 | Pierce | 219/130.1 |
| 3,519,785 | 7/1970 | Vetter | 219/98 |
| 3,566,072 | 2/1971 | Pierce | 219/130.1 |
| 3,852,559 | 12/1974 | Tauern | 219/98 |
| 4,804,811 | 2/1989 | Raycher et al. | 219/98 |

Primary Examiner—Clifford C. Shaw
Attorney, Agent, or Firm—Allen D. Gutchess, Jr.

[57] ABSTRACT

A stud welding machine features several welding outputs for welding tools with different polarity for various welding operations. The polarity of at least one welding output is reversible.

9 Claims, 1 Drawing Sheet

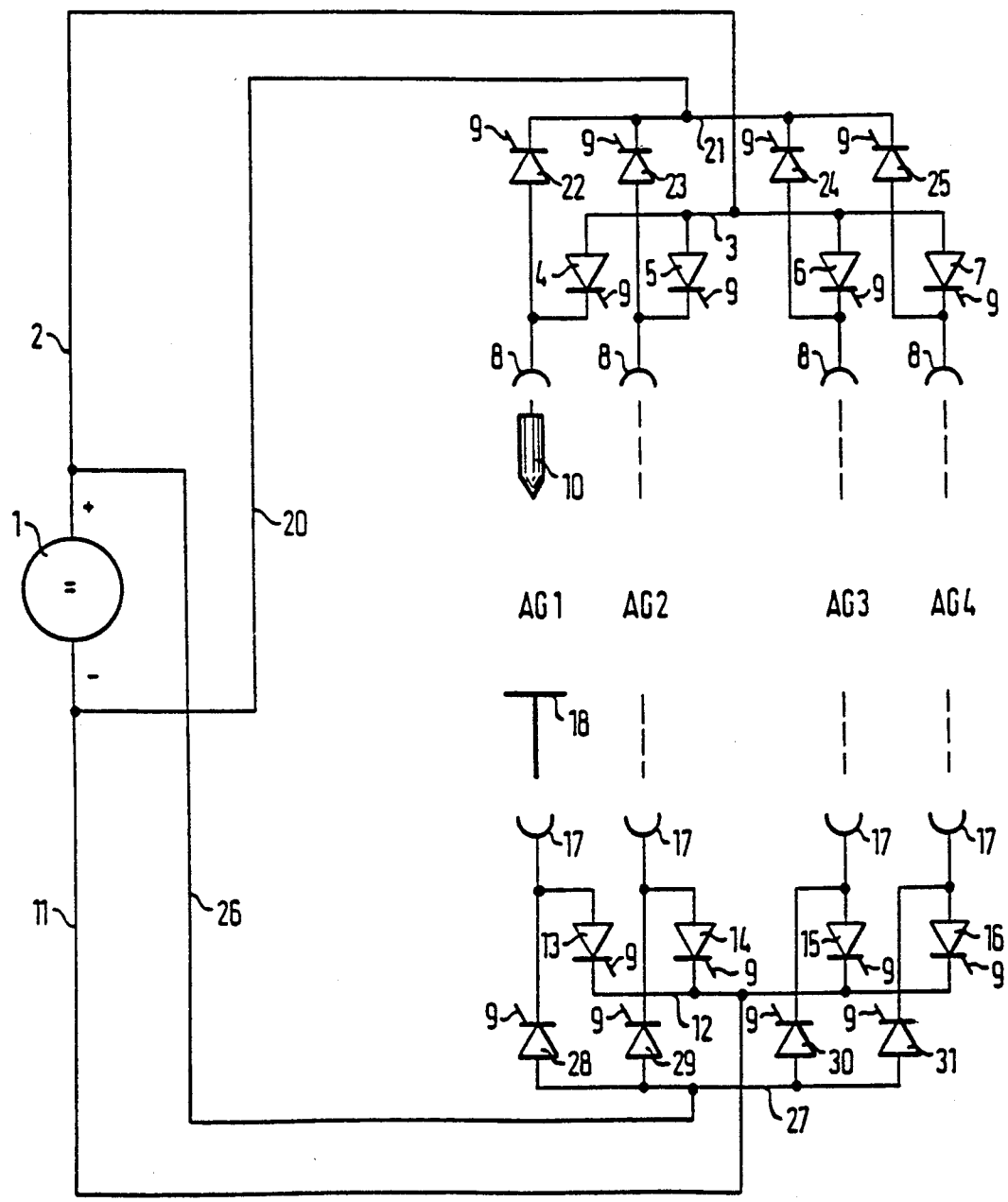

STUD-WELDING CIRCUIT WITH A PLURALITY OF OUTPUTS

This is a continuation of application PCT/DE90/00599 filed on Aug. 3, 1990.

The invention concerns a stud welding machine with several welding outputs for welding tools with different polarity for various welding operations.

A stud welding machine exists which supports several welding outputs, four, for example, that do not possess a different polarity. The disadvantage, therefore, lies in the necessity of changing connections of the welding cables. Such controllers are not optimally suited for the application in connection with robotically-operated welding tools or the like in transfer lines.

The invention is based on the creation of a controller which makes it possible that the polarity of the welding outputs will adjust itself according to given welding operations at the time.

Since the polarity of all welding outputs can be reversed, the controller is therefore able to adjust to different welding operations without changing the connections of the welding cables. Especially when the reversing of the polarity of the welding outputs is controllable, for example, through a program or remote control, is such stud welding machine excellently suited for employment in connection with robot-operated stud welding tools in transfer lines.

Further developments of the invention are demonstrated in the following claims.

The invention is subsequently further explained with reference to a drawing of a demonstrated execution example.

The drawing shows a wiring diagram of a stud welding machine according to the invention.

The stud welding machine features a direct current source 1, where the positive pole is connected via line 2 with a conductor 3. Four controllable electronic switches in the form of silicon controlled rectifiers or thyristors 4, 5, 6, and 7, for example, are connected with their ends to this conductor. The cathode connections of these thyristors are connected with plug connections 8 of the welding outputs AG1, AG2, AG3, and AG4. These welding outputs are generally fashioned of special sockets. Should the control electrodes 9 be applied to voltage via non-represented switches, which are located at the controller for hand operation or on the welding tool for remote control, the thyristors are switched to a transmission state. Through this the plug connections 8 receive positive potential.

As illustrated at the welding output AG1 the welding tool is connected in such a fashion that the stud to be welded 10 shows positive potential for a certain welding operation.

The negative pole of the direct current source 1 is connected via a line 11 to a conductor 12. The cathodes of the controllable electronic switches in the form of silicon controlled rectifiers or thyristors 13, 14, 15, and 16 are connected to this conductor 12. The anodes of these thyristors are connected via plug connectors 17 of the welding outputs AG1, AG2, AG3, and AG4. The workpiece 18 is connected to the plug connector 17 of the welding output AG1, to which the stud 10 is to be butt-welded. The workpiece 18 is grounded, as usual.

Preferably the stud welding machine is equipped in such a way that all four welding outputs are only temporarily successively usable. To this end a non-represented controller is built-in, which only switches a welding output on each time its respective welding tool establishes the electrical circuit to the welding current first.

Furthermore, the negative pole of the direct current source 1 is connected via a line 20 to a conductor 21. The controllable electronic switches in the form of silicon controlled rectifiers or thyristors 22, 23, 24, and 25 are connected with their cathodes to this conductor 21. The anodes of these thyristors are connected with the plug connectors 8. Their controlled electrodes 9 are on the other hand accessed just like those of the thyristors 4, 5, 6, and 7.

Furthermore, the positive pole of the direct current source 1 is connected via a line 26 to a conductor 27. The anodes of controllable electronic switches in the form of silicon controlled rectifiers or thyristors 28, 29, 30, and 31 are connected to this conductor. The cathodes are connected to the plug connectors 17.

The control electrodes 9 are connected here too in similar fashion like those of the other thyristors with corresponding switches at the controller or on the welding tool.

Through this illustrated circuit, each of the welding outputs AG1, AG2, AG3, and AG4 with their plug connectors 6 and 17 can be poled in such a way, depending on which thyristors are switched into transmission state, that when the plug connector 8 is positive, plug connector 17 is negative or when plug connector 8 is negative, then the plug connector 17 is positive.

The welding outputs AG1 through AG4 can thus be poled alternately from case to case according to the welding operations at hand. Such demands are especially made should such a controller be implemented for robot welding or for transfer lines. The switching on of thyristors can therefore occur via pre-programmed operating elements.

I claim:

1. Stud welding apparatus having several welding outputs for welding tools with said outputs each having independently reversible polarities for various welding operations, said apparatus comprising means forming a first plurality of connectors, means forming a second plurality of connectors, a direct welding current source, a first plurality of controllable electronic switches connected between one side of said direct current source and said first plurality of connectors, a second plurality of controllable electronic switches connected between the other side of said direct current source and said second plurality of connectors, said electronic switches being controllable to connect a particular side of said direct current source with particular output connectors, a third plurality of controllable electronic switches connected between said other side of said direct current source and said first plurality of connectors, and a fourth plurality of controllable electronic switches connected between said one side of said direct current source and said second plurality of connectors.

2. Stud welding apparatus according to claim 1 characterized by each of said electronic switches being a thyristor.

3. Stud welding apparatus according to claim 1 characterized by means to control said controllable electronic switches through at least one hand-operated switch located on a stud welding device or remotely controlled by a welding gun.

4. Stud welding apparatus according to claim 1 characterized by means to control said controllable electronic switches by an electronic control unit connected to a stud welding machine.

5. Stud welding apparatus having several welding outputs including at least one having different polarities for various welding operations, said apparatus comprising means forming a first connector for said one output, means forming a second connector for said one output, a direct welding current source, first controllable electronic switch means connected between one side of said direct current source and said first connector, second controllable electronic switch means connected between the other side of said direct current source and said second connector, said electronic switch means being controllable to connect a particular side of said direct current source with a particular one of said first and second connectors, a third plurality of controllable electronic switch means connected between said other side of said direct current source and said first connector, and fourth controllable electronic switch means connected between said one side of said direct current source and said second connector.

6. Stud welding apparatus according to claim 5 characterized by cathodes of said first switch means being connected to said one side of said direct current source and cathodes of said second electronic switch means being connected to said other side of said direct current source.

7. Stud welding apparatus according to claim 6 characterized by cathodes of said fourth switch means being connected to said one side of said direct current source and cathodes of said third electronic switch means being connected to said other side of said direct current source.

8. Stud welding apparatus according to claim 5 characterized by said electronic switch means being thyristors.

9. Stud welding apparatus according to claim 8 characterized by cathodes of said fourth switch means being connected to said one side of said direct current source and cathodes of said third electronic switch means being connected to said other side of said direct current source.

* * * * *